United States Patent
Litvak et al.

(10) Patent No.: US 10,169,657 B2
(45) Date of Patent: Jan. 1, 2019

(54) METHOD OF EXTRACTING LOGO MASK FROM VIDEO STREAM HAVING LOGO

(71) Applicant: SAMSUNG ELECTRONICS CO., LTD., Suwon-si, Gyeonggi-do (KR)

(72) Inventors: Shai Litvak, Beit Hashmonai (IL); Tomer Avidor, Petch Tikva (IL); Yechiel Lamash, Zichron Yaakov (IL)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 16 days.

(21) Appl. No.: 15/623,811

(22) Filed: Jun. 15, 2017

(65) Prior Publication Data
US 2018/0018522 A1 Jan. 18, 2018

(30) Foreign Application Priority Data
Jul. 18, 2016 (KR) .......................... 10-2016-0090888

(51) Int. Cl.
*G06K 9/00* (2006.01)
*G06K 9/46* (2006.01)

(52) U.S. Cl.
CPC ...... *G06K 9/00744* (2013.01); *G06K 9/00711* (2013.01); *G06K 9/4604* (2013.01); *G06K 9/4661* (2013.01); *G06K 2209/25* (2013.01)

(58) Field of Classification Search
CPC .......... G06K 2209/25; G06K 9/00711; G06K 9/00744; G06K 9/4604; G06K 9/4661
See application file for complete search history.

(56) References Cited

U.S. PATENT DOCUMENTS

| | | | |
|---|---|---|---|
| 9,025,885 B2 | 5/2015 | Alpert et al. | |
| 9,398,249 B2 | 7/2016 | Alpert et al. | |
| 9,426,337 B2 | 8/2016 | Slutsky et al. | |
| 2014/0002728 A1 | 1/2014 | Alpert et al. | |
| 2014/0079321 A1* | 3/2014 | Huynh-Thu | G06K 9/00711 382/203 |
| 2017/0169056 A1* | 6/2017 | Brailovsky | G06F 17/30247 |

OTHER PUBLICATIONS

Beric, Aleksandar, "Video Post Processing Architectures", May 8, 2008, Technische Universiteit Eindhoven, Eindhoven, NL.

* cited by examiner

*Primary Examiner* — Phuoc Tran
(74) *Attorney, Agent, or Firm* — F. Chau & Associates, LLC

(57) ABSTRACT

In a method of extracting a logo mask from a video stream having a logo, a video stream including a plurality of frames is received. A plurality of online-weighted-average frames is sequentially generated using the video stream. A logo-boundary-score map is generated using a current frame among the plurality of frames and a current online-weighted-average frame among the plurality of online-weighted-average frames. The logo-boundary-score map includes a plurality of logo-boundary-score entries, each of which corresponds to one of a plurality of pixels of the video stream and includes a probability that a corresponding one of the plurality of pixels is a logo-boundary pixel. The logo mask includes a plurality of entries, each of which corresponds to one of the plurality of pixels and represents whether a corresponding one of the plurality of pixels is a logo pixel or a non-logo pixel.

19 Claims, 12 Drawing Sheets

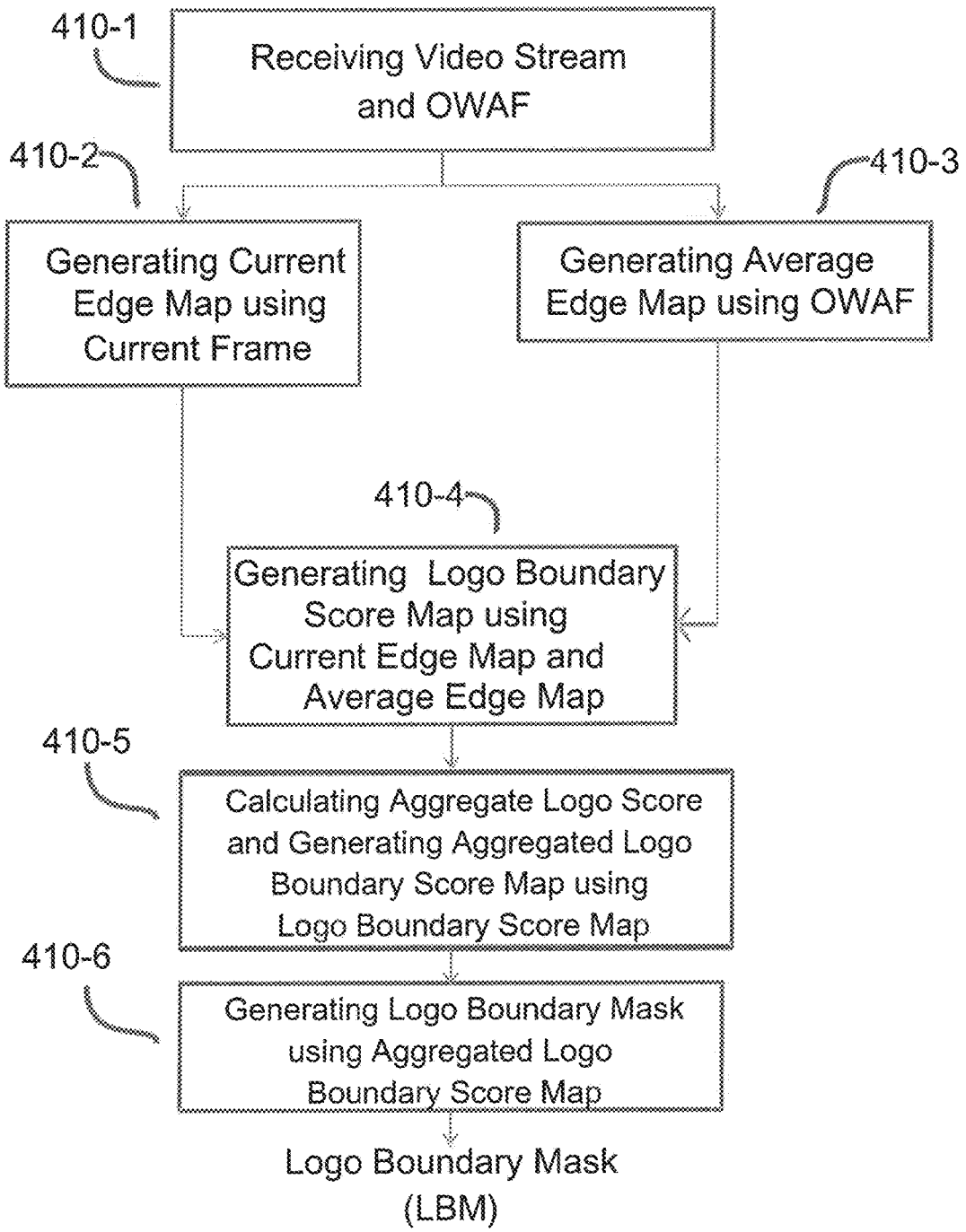

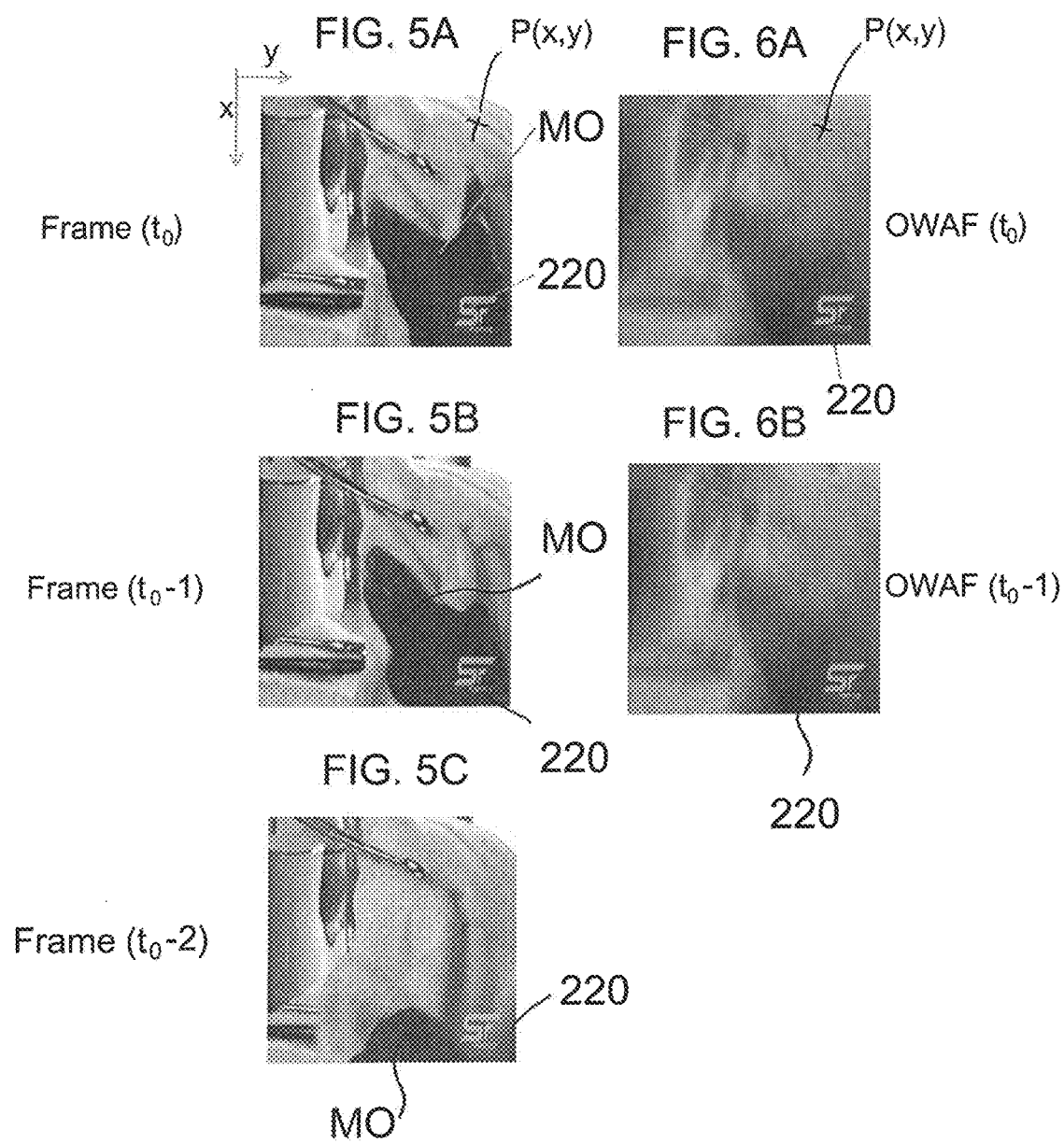

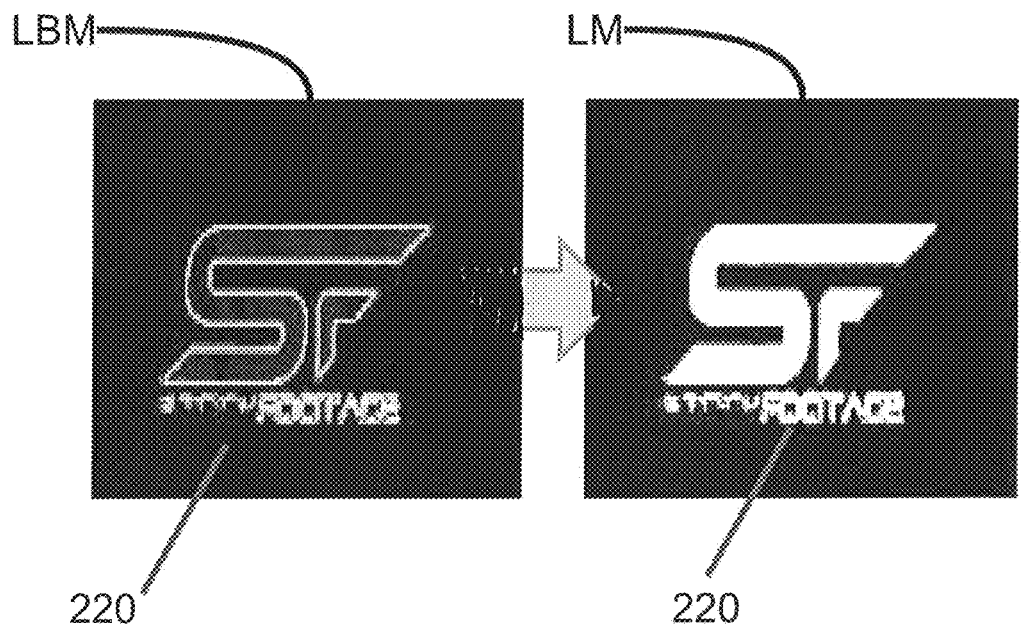

METHOD OF EXTRACTING LOGO MASK FROM VIDEO STREAM HAVING LOGO

CROSS-REFERENCE TO RELATED APPLICATION

This application claims priority under 35 U.S.C. § 119 to Korean Patent Application No. 10-2016-0090888, filed on Jul. 18, 2016 in the Korean Intellectual Property Office, the disclosure of which is incorporated by reference herein in its entirety.

TECHNICAL FIELD

Exemplary embodiments of the present inventive concept relate to a method of extracting a logo mask from a video stream having a logo.

DISCUSSION OF RELATED ART

In many television and Internet channels, broadcasted video streams often include a logo component. The logo component is an overlaid graphic mark or text that is merged on top of the original video, typically before broadcasting. A logo can be opaque or semi-transparent, and generally remains static while overlaid on changing video content.

SUMMARY

According to an exemplary embodiment of the present inventive concept, a method of extracting a logo mask from a video stream having a logo is provided as follows. The video stream including a plurality of frames is received. A plurality of online-weighted-average frames is sequentially generated using the video stream. A logo-boundary-score map is generated using a current frame among the plurality of frames and a current online-weighted-average frame among the plurality of online-weighted-average frames. The logo-boundary-score map includes a plurality of logo-boundary-score entries, each of which corresponds to one of a plurality of pixels of the video stream and includes a probability that a corresponding one of the plurality of pixels is a logo-boundary pixel. The logo mask includes a plurality of entries, each of which corresponds to one of the plurality of pixels and represents whether a corresponding one of the plurality of pixels is a logo pixel or a non-logo pixel.

According to an exemplary embodiment of the present inventive concept, a method of extracting a logo mask from a video stream having a logo provided as follows. The video stream including a plurality of frames is received. A plurality of online-weighted-average frames is sequentially generated using the video stream. A logo-boundary mask is generated using a current frame among the plurality of frames and a previous online-weighted-average frame among the plurality of online-weighted-average frames. The logo-boundary mask includes a logo-boundary pixel and a non-logo-boundary pixel. The logo-boundary mask is filled to generate the logo mask according to a plurality of logo-boundary scores. A first logo-boundary score of the non-logo-boundary pixel is determined by comparing an intensity of the non-logo-boundary pixel in the current frame and an average intensity of the non-logo-boundary pixel in a current online-weighted-average frame among the plurality of online-weighted-average frames. The logo mask includes a plurality of entries, each of which represents whether a pixel of the video stream is a logo pixel or a non-logo pixel.

According to an exemplary embodiment of the present inventive concept, a method of detecting a logo from a video stream is provided as follows. The video stream including a plurality of frames is received. A current edge map is generated using a current frame among the plurality of frames. A current online-weighted-average frame is generated by recursively adding an intensity of the current frame of the video stream to an intensity of a previous online-weighted-average frame. An average edge map is generated using the current online-weighted-average frame. A logo-boundary-score map is generated using the current edge map and the average edge map.

BRIEF DESCRIPTION OF DRAWINGS

These and other features of the present inventive concept will become more apparent by describing in detail exemplary embodiments thereof with reference to the accompanying drawings of which:

FIG. 4 is a flowchart showing an operation of a logo boundary detector of FIG. 2 according to an exemplary embodiment of the present inventive concept;

FIGS. 5A to 5C show a plurality of frames sequentially received by the logo mask generator of FIG. 2 according to an exemplary embodiment of the present inventive concept;

FIGS. 6A and 6B show a plurality of online-weighted-average frames according to an exemplary embodiment of the present inventive concept;

FIG. 9A shows a logo-boundary mask generated from the logo boundary detector of FIG. 2 according to an exemplary embodiment of the present inventive concept;

FIG. 9B shows a logo mask generated from a logo filling unit of FIG. 2 according to an exemplary embodiment of the present inventive concept;

Figure 1:
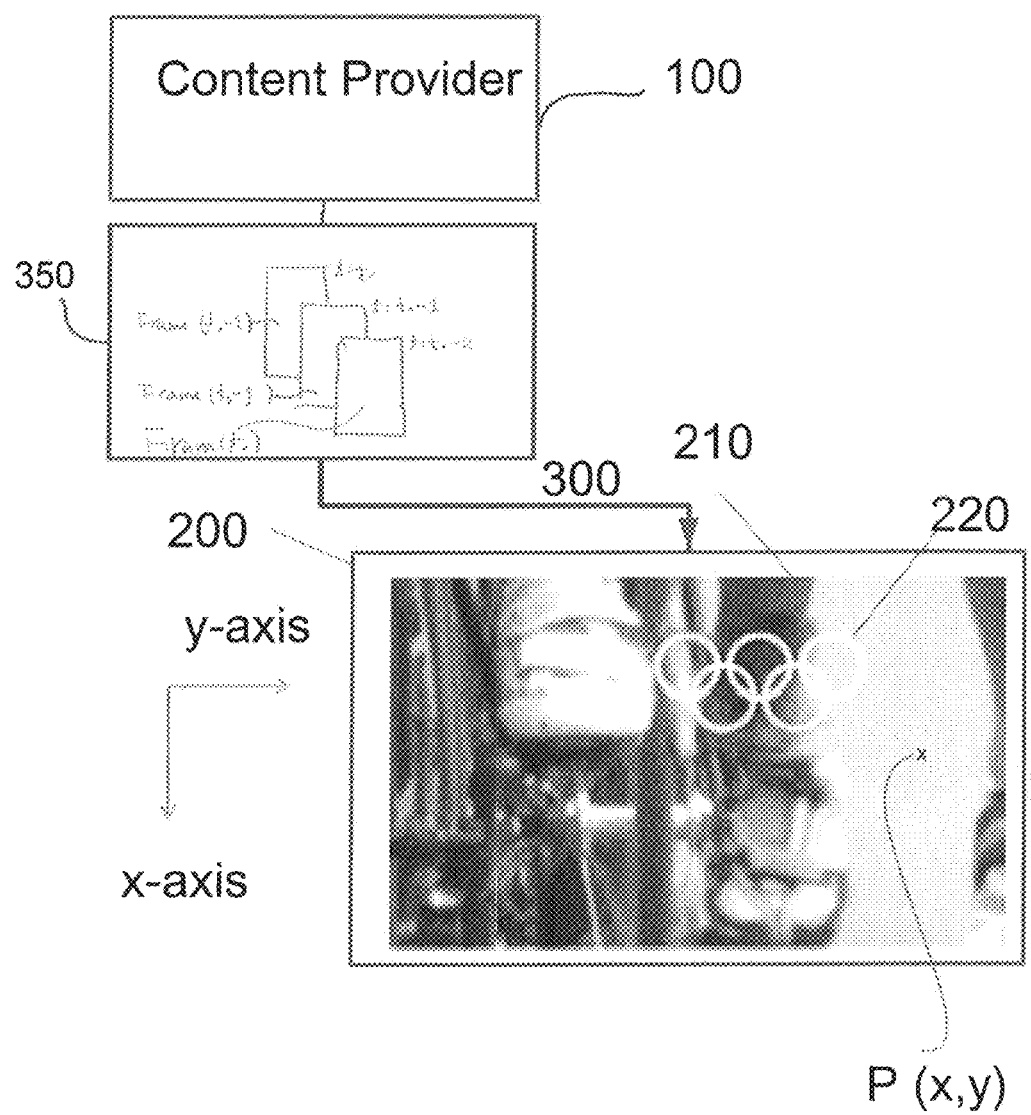
FIG. 1 shows a broadcasting system transmitting a video stream having a logo thereon according to an exemplary embodiment of the present inventive concept.

It will be appreciated that, for simplicity and clarity of illustration, elements illustrated in the drawings have not necessarily been drawn to scale. For example, the dimensions of some of the elements are exaggerated relative to other elements for clarity. Further, where considered appropriate, reference numerals have been repeated among the drawings to indicate corresponding or analogous elements.

DETAILED DESCRIPTION OF EXEMPLARY EMBODIMENTS

Exemplary embodiments of the present inventive concept will be described in detail below with reference to the accompanying drawings. However, the present inventive concept may be embodied in different forms and should not be construed as limited to the exemplary embodiments set forth herein.

FIG. 1 shows a broadcasting system transmitting a video stream having a logo thereon according to an exemplary embodiment of the present inventive concept. The broadcasting system includes a content provider 100, a recipient 200, and a broadcasting channel 300.

The content provider 100 transmits a video stream 350 including a logo 220 to the recipient 200 over the broadcasting channel 300. The video stream 350 includes a plurality of frames provided sequentially through the broadcasting channel 300. For example, a current frame Frame ($t_0$) is the most recent frame, a first previous frame Frame ($t_0$-1) is provided immediately before the provision of the current frame Frame ($t_0$); a second previous Frame ($t_0$-2) is provided immediately before the provision of the first previous frame Frame ($t_0$-1). For convenience of description, only three frames Frame ($t_0$) to Frame ($t_0$-2) are illustrated in FIG. 1.

Each of the frames Frame ($t_0$) to Frame ($t_0$-2) of the video stream 350 has a plurality of pixels P and a coordinate system indicating one of the plurality of pixels P. The plurality of pixels P may include M pixels along an x-axis and N pixels along a y-axis perpendicular to the x-axis, where each of M and N is a natural number greater than or equal to 1. Thus, a total number of the plurality of pixels is M×N. A pixel of the video stream 350 located at a coordinate (x, y) is referred to as P (x, y), where x is a whole number greater than or equal to 0 and less than M and y is a whole number greater than or equal to 0 and less than N.

The content provider 100 merges the logo 220 with content such as an original video to generate the video stream 350 before broadcasting for various purposes. For example, the logo 220 may show the copyright holder of the original video to the recipient 200. The recipient 200 receives the video stream 350 through an electronic device. The recipient 200 and the electronic device may be interchangeably used in this specification. In exemplary embodiments of the present inventive concept, the electronic device 200 may include a television (TV), a computer, a smartphone, or the like. The electronic device 200 may receive the video stream 350 and display a frame 210 on its screen. In this case, the frame 210 displayed at t=$t_0$ (at the present or current time) may be referred to as the current frame Frame ($t_0$). The frame 210 may include the plurality of pixels P. As described above, the location of the pixel P (x, y) is the coordinate (x, y) defined by an x-axis coordinate (for example, x) and a y-axis coordinate (for example, y).

According to an exemplary embodiment of the present inventive concept, the electronic device 200 may perform image processing to extract or detect logo pixels from the video stream 350, where the logo pixels are processed independently of other video pixels (non-logo pixels) for various purposes including Frame Rate Conversion (FRC), video editing, video enhancement, or copyright infringement detection. For example, in FRC, a logo mask extracted from the video stream 350 is merged with an interpolated frame from two adjacent frames of the video stream 350.

The broadcasting channel 300 may be a signal transmission media including, for example, air or wire.

The frame 210 includes the logo 220. The logo 220 may be referred to as an overlaid graphic mark or text that is merged on top of the original video in the frame 210. The logo 220 may be opaque or semi-transparent, and is mixed with the original video to form the frame 210.

In an exemplary embodiment of the present inventive concept, it is assumed that 1) the logo 220 has sharp boundary edges that have a constant shape, while other objects in the original video continue to change their shape over time or a sequence of a plurality of frames; and 2) the location of the logo 220 among the plurality of frames is static, while other objects change their locations over time.

For example, the logo 220 remains in an online-weighted-average frame which is a resultant frame obtained by averaging the plurality of frames by weight. As each of the plurality of frames is averaged with its previous frames in the calculation of the online-weighted-average frame, the boundary edges of the logo 220 become more pronounced while edges of moving objects become blurred as the number of frames increases. The online-weighted-average frame will be described below with reference to FIG. 3.

Figure 2:
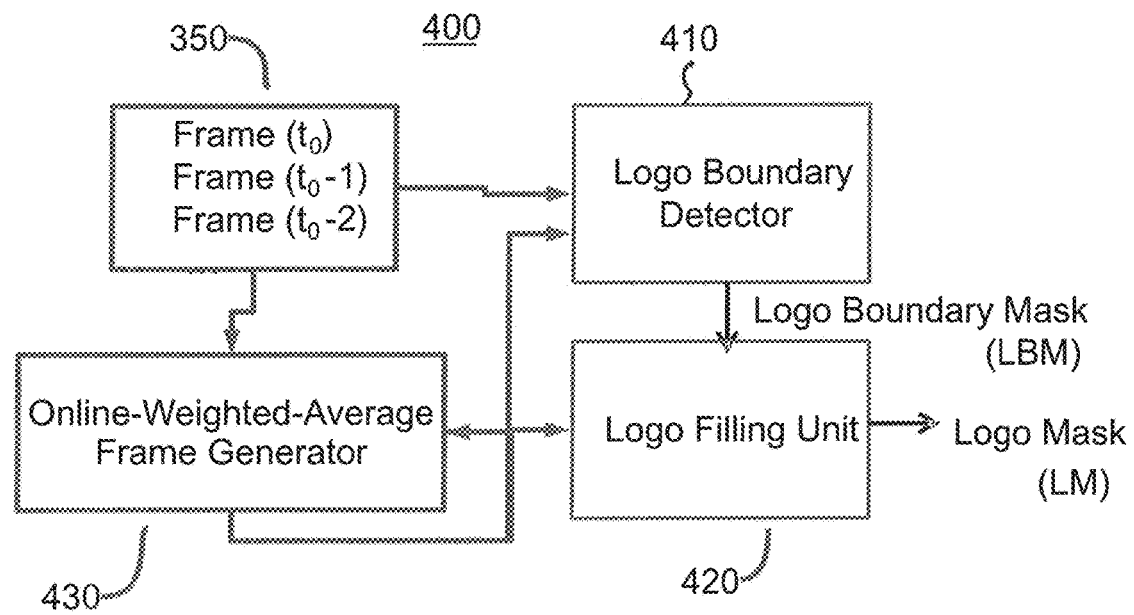
FIG. 2 shows a logo mask generator according to an exemplary embodiment of the present inventive concept.

FIG. 2 shows a logo mask generator according to an exemplary embodiment of the present inventive concept. The logo mask generator 400 may be included in the electronic device 200 of FIG. 1. The logo mask generator 400 may be implemented as hardware or software.

The logo mask generator 400 includes a logo boundary detector 410, a logo filling unit 420, and an online-weighted-average frame generator 430.

The logo mask generator 400 receives the video stream 350 including the plurality of frames (e.g., Frame ($t_0$) to Frame ($t_0$-2)) transmitted sequentially over the broadcasting channel 300. The logo boundary detector 410 performs an edge detection operation on the current frame Frame ($t_0$) from the video stream 350 and a previous online-weighted-average frame OWAF ($t_0$-1) from the online-weighted-average frame generator 430, and generates a logo-boundary mask LBM as an output. The previous online-weighted-average frame OWAF ($t_0$-1) is an online-weighted-average frame generated from the plurality of the frames up to and including the first previous frame Frame ($t_0$-1), which will be described in more detail below.

The logo-boundary mask LBM may be an M×N matrix of which each entry indicates whether a corresponding pixel of the video stream 350 is a logo-boundary pixel. The pixel on the boundary of the logo 220 may be referred to as a logo-boundary pixel. In an exemplary embodiment of the present inventive concept, the boundary of the logo 220 may define a location of the logo 220 in the video stream 350 and a shape of the logo 220. In an exemplary embodiment of the present inventive concept, the logo-boundary mask stores a binary value of "1" or a value of "0" for each of the plurality of pixels P in the frame 210.

According to an exemplary embodiment of the present inventive concept, the logo-boundary mask LBM includes the plurality of logo-boundary entries, where each of the plurality of logo-boundary entries represents whether a corresponding pixel of the video stream 350 is a logo-boundary pixel or a non-logo-boundary pixel in the video stream 350.

The logo filling unit 420 receives the logo-boundary mask LBM from the logo boundary detector 410. The logo filling unit 420 also receives the plurality of frames including the current frame Frame ($t_0$) over the broadcasting channel 300 and a current online-weighted-average frame OWAF ($t_0$) from the online-weighted-average frame generator 430. With the plurality of frames of the video stream 350 and the logo-boundary mask LBM, the logo filling unit 420 performs a logo filling operation on the logo-boundary mask LBM to generate a logo mask LM. The logo filling operation will be described below with reference to FIGS. 10 to 13.

The online-weighted-average frame generator 430 receives the plurality of frames of the video stream 350 over the broadcasting channel 300 and generates a plurality of online-weighted-average frames OWAF in a recursive manner, which will be described below with reference to FIG. 3. As described above, the plurality of online-weighted-average frames OWAF is output to the logo boundary detector 410 and the logo filling unit 420.

The current online-weighted-average frame OWAF ($t_0$) is represented by an online-weighted-average intensity $I(x, y)_{t0}^{avg}$ of each pixel P at the coordinate (x, y) at timing $t=t_0$, where x represents a coordinate of the x-axis and y represents a coordinate of the y-axis. The online-weighted-average intensity $I(x, y)_{t0}^{avg}$ is calculated by the following equation:

$$I(x,y)_{t0}^{avg} = (1-w_{t0}) \cdot I(x,y)_{t0-1}^{avg} + w_{t0} \cdot I(x,y)_{t0}$$

$I(x, y)_{t0}$ represents an intensity of the pixel P (x, y) in the current frame Frame ($t_0$), $I(x, y)_{t0-1}^{avg}$ represents a previous online-weighted-average intensity of the pixel P (x, y) in the previous online-weighted-average frame OWAF ($t_0$-1), and $w_{t0}$ represents a weight value of the current frame Frame ($t_0$) that is a positive rational number. Additionally, $I(x, y)_{t0-1}^{avg}$ or $I_0$ represents an initial value of the online-weighted-average intensity of the pixel P (x, y) at $t_0=0$.

In an exemplary embodiment of the present inventive concept, the logo mask generator 400 may be implemented using software executed by a computer processor or a graphic processor. However, the present inventive concept is not limited thereto. For example, the logo mask generator 400 may be implemented using an electronic circuit implemented on a semiconductor substrate.

Figure 3:
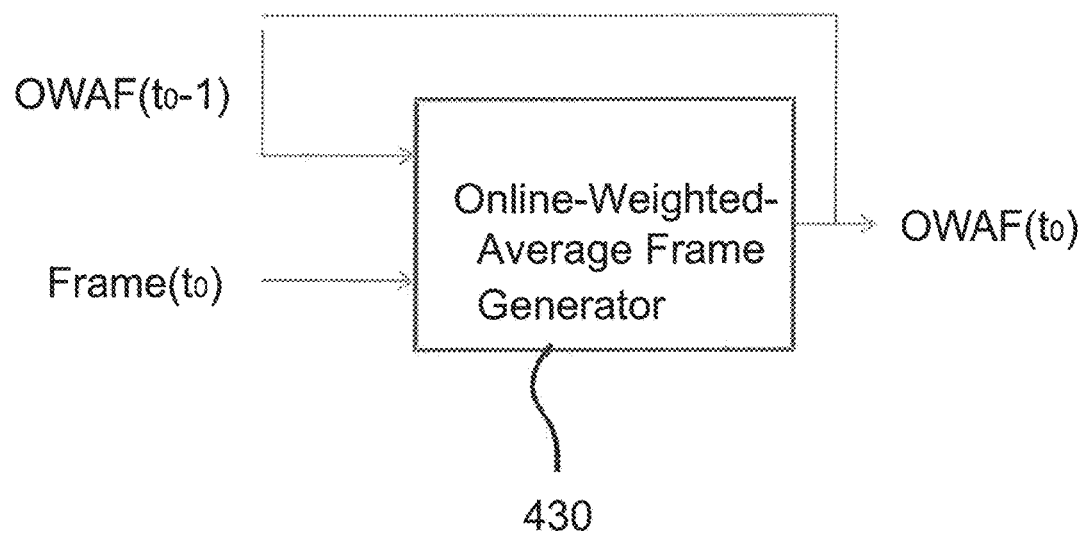
FIG. 3 shows an online-weighted-average frame generator of FIG. 2 according to an exemplary embodiment of the present inventive concept.

FIG. 3 shows an online-weighted-average frame generator of FIG. 2 according to an exemplary embodiment of the present inventive concept.

Referring to FIG. 3, the online-weighted-average frame generator 430 receives the current frame Frame ($t_0$) from the video stream 350 and the previous online-weighted average frame OWAF ($t_0$-1) from itself, and outputs the current online-weighted average frame OWAF ($t_0$).

Hereinafter, the edge detection operation performed by the logo boundary detector 410 will be described with reference to FIGS. 4 to 8B, and the logo filling operation performed by the logo filling unit 420 will be described with reference to FIGS. 10 to 13.

Figure 7A:
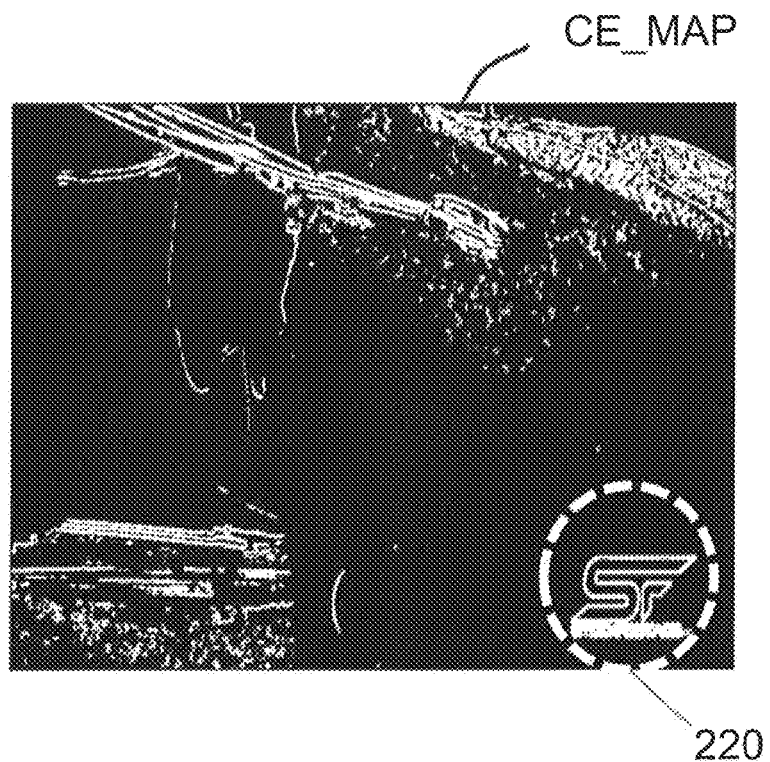
FIG. 7A shows a current edge map generated from a current frame of FIG. 5A according to an exemplary embodiment of the present inventive concept.
Figure 7B:
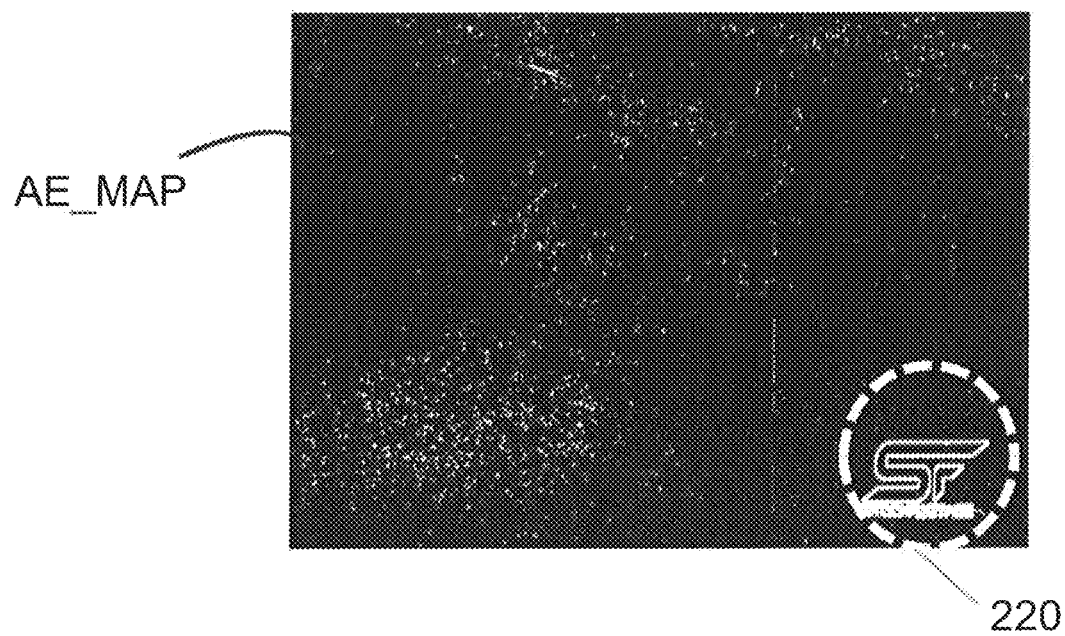
FIG. 7B shows an average edge map generated from a current online-weighted-average frame of FIG. 6A according to an exemplary embodiment of the present inventive concept.
Figure 8A:
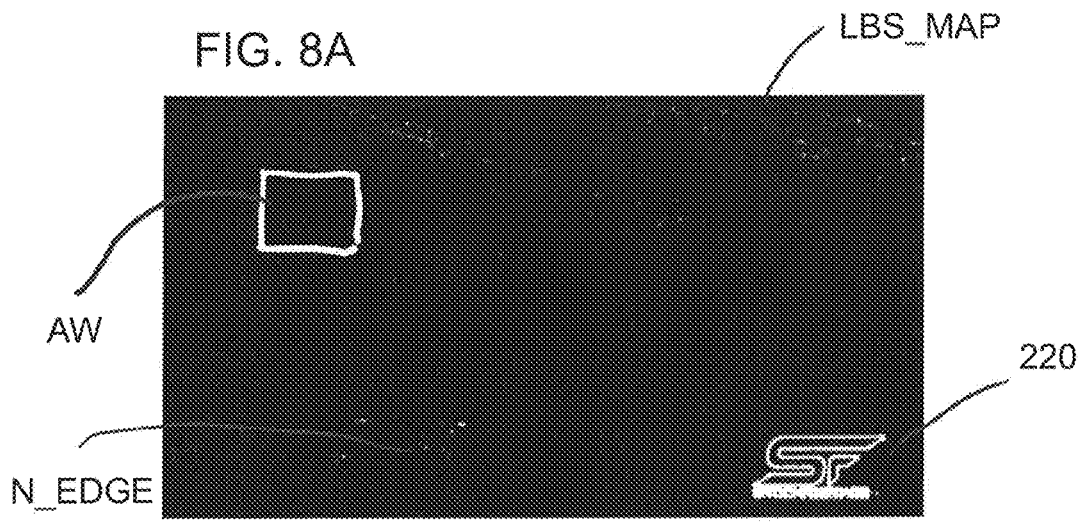
FIG. 8A shows a logo-boundary-score map of the current frame of FIG. 5A according to an exemplary embodiment of the present inventive concept.
Figure 8B:
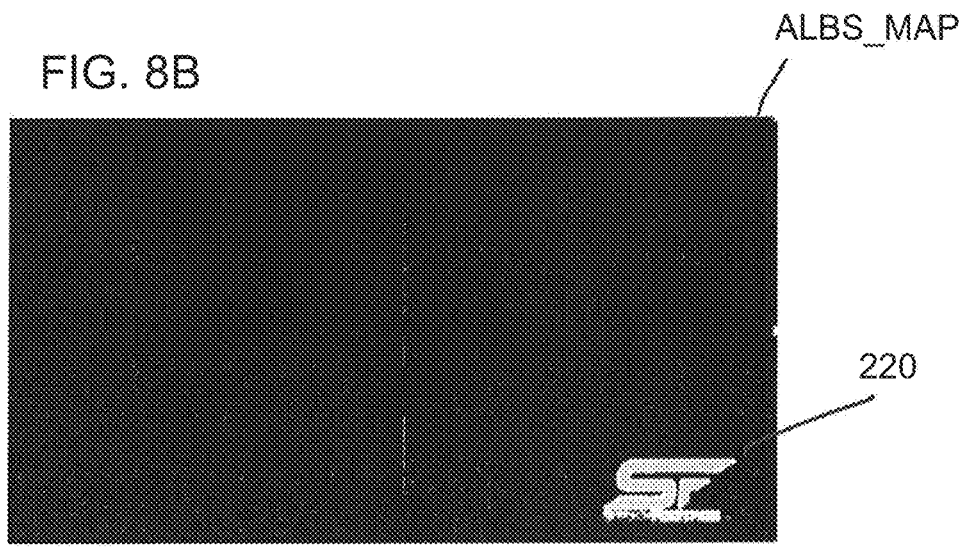
FIG. 8B shows an aggregated-logo-boundary-score map of the current online-weighted-average frame of FIG. 6A according to an exemplary embodiment of the present inventive concept.

FIG. 4 is a flowchart showing an operation of a logo boundary detector of FIG. 2 according to an exemplary embodiment of the present inventive concept. FIGS. 5A to 5C show a plurality of frames sequentially received by the logo mask generator of FIG. 2 according to an exemplary embodiment of the present inventive concept. FIGS. 6A and 6B show a plurality of online-weighted-average frames according to an exemplary embodiment of the present inventive concept. FIG. 7A shows a current edge map of a current frame of FIG. 5A according to an exemplary embodiment of the present inventive concept. FIG. 7B shows an average edge map of a current online-weighted-average frame of FIG. 6A according to an exemplary embodiment of the present inventive concept. FIG. 8A shows a logo-boundary-score map of the current frame of FIG. 5A according to an exemplary embodiment of the present inventive concept. FIG. 8B shows an aggregated-logo-boundary-score map of the current online-weighted-average frame of FIG. 6A according to an exemplary embodiment of the present inventive concept.

Referring to FIGS. 2 and 4 together, in operation 410-1, the logo boundary detector 410 receives the plurality of frames including the current frame Frame ($t_0$) of the video stream 350 and the plurality of online-weighted-average frames OWAF from the online-weighted-average frame generator 430.

For convenience of description, it is assumed here that the logo boundary detector 410 receives the video stream 350 including, for example, three consecutive frames Frame ($t_0$), Frame ($t_0$-1), and Frame ($t_0$-2) received at timings $t_0$, $t_0$-1, and $t_0$-2, respectively, in operation 410-1. For example, at the timing $t_0$, the logo boundary detector 410 performs the operations of FIG. 3 on the current frame Frame ($t_0$). At the timing $t_0$-1 immediately before the timing $t_0$, the logo boundary detector 410 also performs the operations of FIG. 3 on the first previous frame Frame ($t_0$-1). At the timing $t_0$-2 immediately before the timing $t_0$-1, the logo boundary detector 410 also performs the operations of FIG. 3 on the second previous frame Frame ($t_0$-2).

Referring to FIGS. 5A to 5C, the logo 220 is positioned at substantially the same location in the frames Frame ($t_0$), Frame ($t_0$-1), and Frame ($t_0$-2). The frames Frame ($t_0$), Frame ($t_0$-1), and Frame ($t_0$-2) include a moving object MO that changes its position over time. For example, in the frames Frame ($t_0$), Frame ($t_0$-1), and Frame ($t_0$-2) sequentially received by the logo boundary detector 410, the position of the moving object MO continues to change while the position of the logo 220 stays substantially the same.

Referring to FIGS. 6A and 6B, FIG. 6A shows the current online-weighted average frame OWAF ($t_0$) and FIG. 6B shows the previous online-weighted average frame OWAF ($t_0$-1). As can be seen, everything (including the moving object MO) becomes relatively blurred except for the logo 220.

Referring back to FIG. 4, in operation 410-2, the logo boundary detector 410 performs the edge detection operation on the current frame Frame ($t_0$) and generates a current edge map CE_MAP, as shown in FIG. 7A. In an exemplary embodiment of the present inventive concept, the edge detection operation includes calculation of an intensity gradient of each pixel P of the current frame Frame ($t_0$). In an exemplary embodiment of the present inventive concept, the edge detection operation may be performed using, for example, a Canny edge detection algorithm. However, the present inventive concept is not limited thereto, and various edge detection algorithms may be used.

In operation 410-3, the logo boundary detector 410 also generates an average edge map AE_MAP, as shown in FIG. 7B, by performing the edge detection operation on the current online-weighted-average frame OWAF ($t_0$) of FIG. 6A.

In an exemplary embodiment of the present inventive concept, the edge detection operation of operation 410-3 may be substantially the same as the edge detection operation of operation 410-2. For example, the edge detection operation may be performed using a Canny edge detection algorithm.

Referring to FIGS. 7A and 7B, the average edge map AE_MAP of FIG. 7B includes the logo 220, while the current edge map CE_MAP of FIG. 7A includes edges of the moving object MO, as well as the logo 220. In the average edge map AE_MAP, edges belonging to the moving object MO in each of the frames Frame ($t_0$), Frame ($t_0$-1), and the Frame ($t_0$-2) are gradually canceled or removed while edges belonging to the logo 220 become more pronounced.

Referring back to FIG. 4, in operation 410-4, the logo boundary detector 410 generates a logo-boundary-score map LBS_MAP, as shown in FIG. 8A, using the current edge map CE_MAP and the average edge map AE_MAP. The logo-boundary-score map LBS_MAP includes a plurality of logo-boundary-score entries, each of which includes a probability of a corresponding pixel being a boundary pixel of the logo 220 of the video stream 350. The probability may be referred to as a logo-boundary score.

In an exemplary embodiment of the present inventive concept, the logo-boundary-score map LBS_MAP includes a logo-boundary score LBS (x, y) of the pixel P (x, y) located at the coordinate (x, y) in the video stream 350. The logo-boundary score LBS (x, y) is calculated as follows:

$$LBS(x, y) = \begin{cases} PositiveVal & \text{if } (grad^{avg}(x, y) > TH1) \text{ AND } (grad^{curr}(x, y) > TH2) \\ NegativeVal & \text{if } (grad^{avg}(x, y) \leq TH1) \text{ OR } (grad^{curr}(x, y) \leq TH2) \end{cases}$$

With respect to the above formula, $grad^{avg}$ (x, y) represents an intensity gradient of the pixel P (x, y) located at the coordinate (x, y) of the current online-weighted-average frame OWAF ($t_0$) of FIG. 6A and $grad^{curr}$ (x, y) represents an intensity gradient of the pixel P(x, y) located at the coordinate (x, y) of the current frame Frame ($t_0$) of FIG. 5A.

In an exemplary embodiment of the present inventive concept, predetermined threshold values may be used to calculate the logo-boundary score LBS (x, y). For example, if $grad^{avg}$ (x, y) is greater than a first threshold value TH1 and if $grad^{curr}$ (x, y) is greater than a second threshold value TH2, the logo-boundary score LBS (x, y) has a positive value PositiveVal, such as 5. In an exemplary embodiment of the present inventive concept, the first threshold value TH1 and the second threshold value TH2 are the same. However, the present inventive concept is not limited thereto. For example, the first threshold value TH1 and the second threshold value TH2 may be different from each other.

If $grad^{avg}$ (x, y) is less than or equal to the first threshold value TH1 or if $grad^{curr}$ (x, y) is less than or equal to the second threshold value TH2, the logo-boundary score LBS (x, y) has a negative value NegativeVal, such as −3.

In an exemplary embodiment of the present inventive concept, the positive value PositiveVal and the negative value NegativeVal may have different values such that the positive value PositiveVal is greater than an absolute value of the negative value NegativeVal.

In an exemplary embodiment of the present inventive concept, the negative value NegativeVal, for example, −7, may be selected to produce a hysteresis by, for example, choosing the absolute value of the negative value NegativeVal to be larger than the positive value PositiveVal.

In an exemplary embodiment of the present inventive concept, if $grad^{avg}$(x, y) and $grad^{curr}$ (x, y) are both greater than a predetermined threshold value, a positive score or value is assigned to the logo-boundary score LBS (x, y); otherwise, a negative score or value is assigned to the logo-boundary score LBS (x, y).

In an exemplary embodiment of the present inventive concept, the greater the logo-boundary score LBS (x, y), the more likely the pixel P (x, y) is a boundary pixel of the logo 220.

In operation 410-5, the logo boundary detector 410 aggregates the logo-boundary-score entries of the logo-boundary-score map LBS_MAP of FIG. 8A to generate an aggregated-logo-boundary-score map ALBS_MAP, as shown in FIG. 8B.

In an exemplary embodiment of the present inventive concept, the aggregation of the logo-boundary-score entries of the logo-boundary-score map LBS_MAP includes a scanning window approach using an aggregating window AW. For example, the logo-boundary detector 410 scans rectangular patches of a fixed, known size in the logo-boundary-score map LBS_MAP. The logo-boundary detector 410 takes an image patch selected by the aggregating window AW as an input image, and outputs a binary result depending on whether the image patch includes an object (such as the boundary of the logo 220) or not.

For example, referring to FIGS. 8A and 8B, the aggregated-logo-boundary-score map ALBS_MAP has aggregate logo-boundary-score entries for the video stream 350. Calculation of the aggregated-logo-boundary-score map ALBS_MAP is performed over the aggregating window AW in the logo-boundary-score map LBS_MAP. An entry of the aggregated-logo-boundary-score map ALBS_MAP is an average of logo-boundary-score entries within the aggregating window AW.

In operation 410-6, the logo boundary detector 410 generates the logo-boundary mask LBM that stores information of whether the video stream 350 has a logo-boundary pixel at timing t=$t_0$. In other words, the logo boundary detector 410 determines whether a given pixel is a logo-boundary pixel in the video stream 350. If an aggregate logo-boundary-score of the logo-boundary-score map LBS_MAP for the pixel is larger than a predetermined threshold value, the pixel is determined as the logo-boundary pixel.

By using the aggregated-logo-boundary-score map ALBS_MAP, the detection of logo-boundary pixels from the video stream 350 may be robust against noise. Noise is not spatially stable, and thus, may be canceled or eliminated by aggregating the logo-boundary-score entries.

For example, FIG. 8A shows a noise N_EDGE of an edge that does not belong to the boundary of the logo 220 in the logo-boundary-score map LBS_MAP generated at the timing t=$t_0$. The logo-boundary-score map LBS_MAP shows positive scores for the logo 220 and the noise N_EDGE. The positive scores are represented as white in FIG. 8A. As shown in FIG. 8B, in the aggregated-logo-boundary-score map ALBS_MAP, the positive scores associated with the noise N_EDGE are canceled so that the noise N_EDGE is not shown.

Calculation of the aggregated-logo-boundary-score map ALBS_MAP is recursively performed on the plurality of frames in the video stream 350 using the following equation:

$$AggScore_{Curr}(x,y)=AggScore_{Prev}(x,y)+Score_{Curr}(x,y)$$

$AggScore_{Curr}$ (x, y) represents a current aggregated-logo-boundary score of the pixel P (x, y) located at the coordinate (x, y) of the video stream 350 at the timing t=$t_0$, AggScore$_{Prev}$(x, y) represents a previous aggregated-logo-boundary score of the pixel P (x, y) located at the coordinate (x, y) of the video stream 350 at the timing t=t$_0$-1, and Score$_{Curr}$(x, y) represents a logo-boundary score of the pixel P (x, y) located at the coordinate (x, y) of the current frame Frame (t$_0$) of the video stream 350 at the timing t=t$_0$. If the current aggregated-logo-boundary score AggScore$_{Curr}$ (x, y) is higher than a predetermined threshold value, the pixel P (x, y) is determined to be a logo-boundary pixel in the video stream 350. Accordingly, the logo-boundary mask LBM is generated.

FIG. 9A shows a logo-boundary mask generated from the logo boundary detector of FIG. 2 according to an exemplary embodiment of the present inventive concept. FIG. 9B shows a logo mask generated from the logo filling unit of FIG. 2 according to an exemplary embodiment of the present inventive concept.

As described above, according to an exemplary embodiment of the present inventive concept, the logo mask generator 400 extracts the logo mask LM from the video stream 350 by using the logo-boundary mask LBM. The logo boundary detector 410 generates the logo-boundary mask LBM.

For example, FIG. 9A shows a visualization of the logo-boundary mask LBM generated by the logo boundary detector 410. The logo filling unit 420 generates the logo mask LM by filling in the logo-boundary mask LBM. Accordingly, FIG. 9B shows a visualization of the logo mask LM that is output by the logo filling unit 420.

Hereinafter, the operation of the logo filling unit 420 will be described with reference to FIGS. 10-13.

Figure 10:
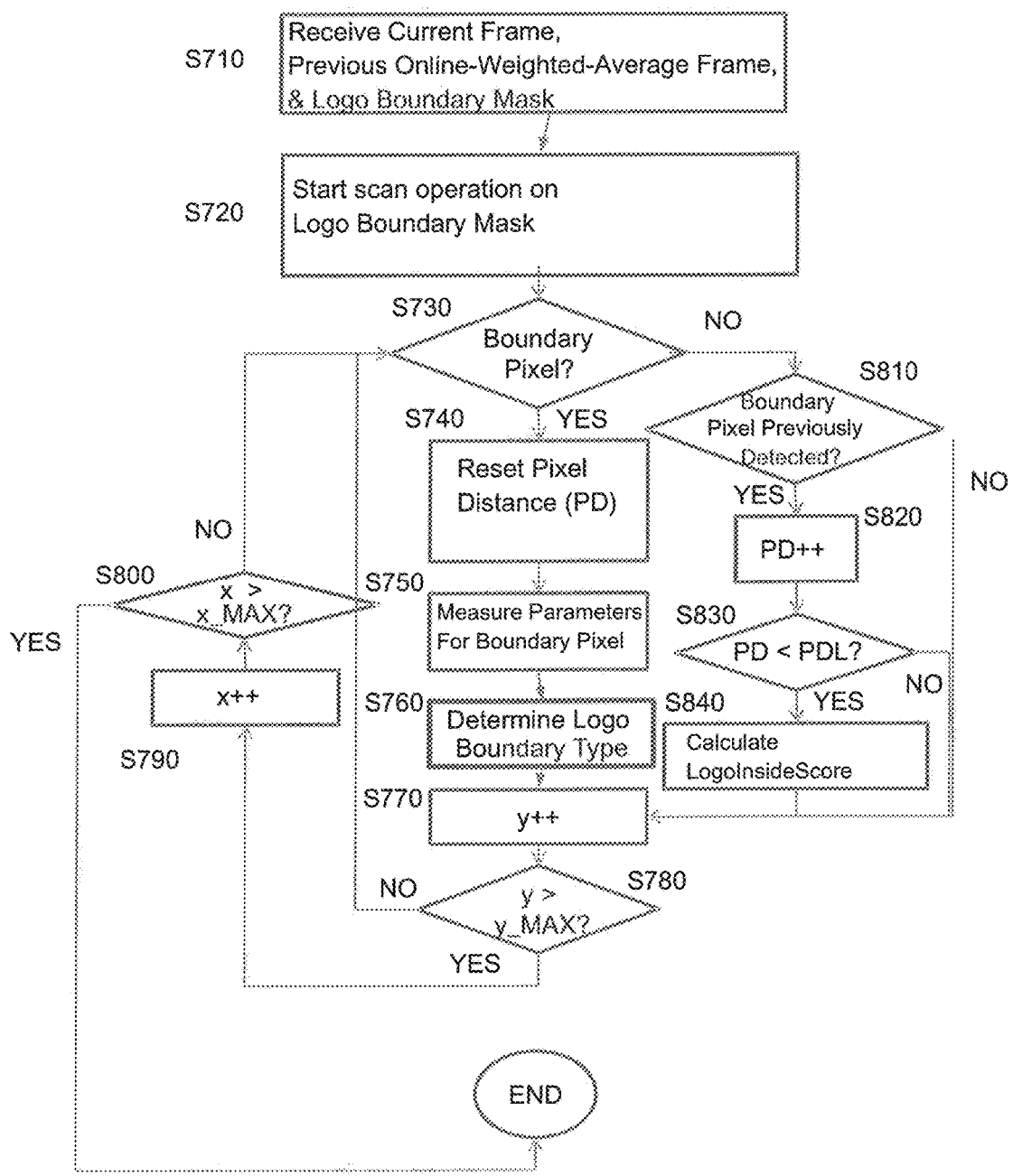
FIG. 10 is a flowchart showing an operation of the logo filling unit of FIG. 2 according to an exemplary embodiment of the present inventive concept.
Figure 11A:
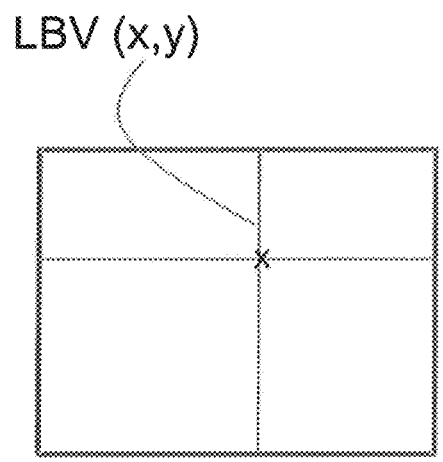
FIGS. 11A to 11C show a scanning operation on a logo-boundary mask according to an exemplary embodiment of the present inventive concept.
Figure 11B:
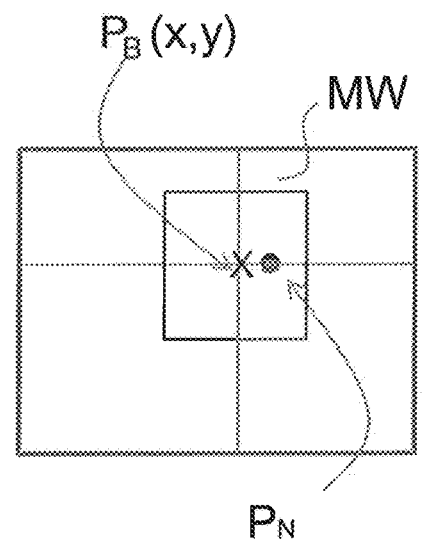
Figure 11C:
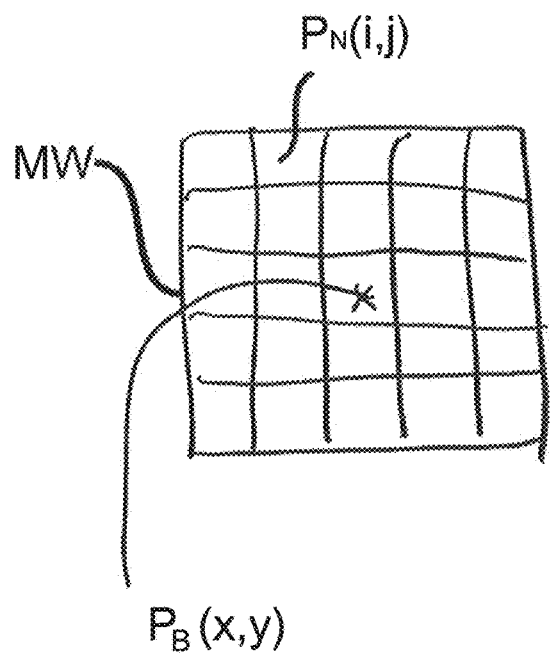

FIG. 10 is a flowchart showing the operation of the logo filling unit of FIG. 2 according to an exemplary embodiment of the present inventive concept. FIGS. 11A to 11C show a scanning operation on a logo-boundary mask according to an exemplary embodiment of the present inventive concept. FIGS. 10 and 11A to 11C will be described together below.

Referring to FIG. 10, in operation S710, the logo filling unit 420 receives the logo-boundary mask LBM, the current frame Frame (t$_0$), and the previous online-weighted-average frame OWAF (t$_0$-1).

In operation S720, the logo filling unit 420 starts to perform a scanning operation on the logo-boundary mask LBM to determine which pixel of the video stream 350 is a logo-boundary pixel in the video stream 350. Each entry of the logo-boundary mask LBM indicates whether its corresponding pixel of the video stream 350 is a boundary pixel or a non-boundary pixel.

The logo filling unit 420 performs a scan or scanning operation on the logo-boundary mask LBM pixel-by-pixel. For convenience of description, it is assumed here that the scanning operation is performed on an entry LBV (x, y) of the logo-boundary mask LBM, as shown in FIG. 11A.

In operation S730, the logo filling unit 420 determines whether the entry LBV (x, y) of the logo-boundary mask LBM has a value indicating a boundary pixel or a non-boundary pixel. If the value of the entry LBV (x, y) indicates a boundary pixel (for example, the value is '1'), the logo filling unit 420 proceeds to operation S740. If the value of the entry LBV (x, y) indicates a non-boundary pixel (for example, the value is '0'), the logo filling unit 420 proceeds to operation S810, which will be described below.

In this case, the entry LBV (x, y) of the logo-boundary mask LBM corresponds to a boundary pixel located at the coordinate (x, y) of the video stream 350. The pixel may be referred to as a boundary pixel P$_B$ (x, y) of the video stream 350.

In operation S740, the logo filling unit 420 initializes a pixel distance PD. Here, the pixel distance PD represents a distance from the boundary pixel P$_B$ (x, y). The pixel distance PD will be described further below. Here, in the scan operation performed on the logo-boundary mask LBM, the logo filling unit 420 resets the pixel distance PD to zero when the logo filling unit 420 determines that the entry LBV (x, y) indicates a boundary pixel.

The logo filling unit 420 then proceeds to operations S750 and S760 to determine a boundary type of the boundary pixel P$_B$ (x, y).

With the coordinate (x, y) of the entry LBV (x, y), the logo filling unit 420 accesses the coordinate (x, y) of the current frame Frame (t$_0$) and a coordinate (i, j) of the previous online-weighted-average frame OWAF (t$_0$-1) to determine I$_{Curr}$ (x, y) and I$_{prev}^{avg}$(i, j), respectively.

I$_{Curr}$ (x, y) represents an intensity of the boundary pixel P$_B$ (x, y) in the current frame Frame (t$_0$). I$_{prev}^{avg}$(i, j) represents an average intensity of a neighboring pixel P$_N$ (i, j) located at the coordinate (i, j) within a measuring window MW in the previous online-weighted-average frame OWAF (t$_0$-1). For the neighboring pixel P$_N$ (i, j), i and j are x-axis and y-axis coordinates, respectively, within the measuring window MW. The measuring window MW may include a plurality of neighboring pixels P$_N$ that surround the boundary pixel P$_B$ (x, y) such that the boundary pixel P$_B$ (x, y) is in the center of the measuring window MW, as shown in FIG. 11B.

For convenience of description, the measuring window MW has a size of 5×5 pixels, for example, as shown in FIG. 11C.

In operation S750, the logo filling unit 420 measures various parameters for the boundary pixel P$_B$ (x, y) using the measuring window MW and the plurality of neighboring pixels P$_N$ therein, as shown in Table I below.

TABLE I

A list of measurements calculated in the measuring window MW during a raster scan operation. A set of conditions for these measurements determines the update to the logo-boundary score of the logo mask LM generated by the logo filling unit 420.

| Measurement | Definition |
| --- | --- |
| BrightCount | Number of brighter pixels.<br>If I$_{prev}^{avg}$(i, j) of a neighboring pixel P$_N$ (i, j) is greater than I$_{Curr}$ (x, y) of the boundary pixel P$_B$ (x, y), the pixel P$_N$ (i, j) is a brighter pixel.<br>I$_{prev}^{avg}$(i, j) represents the average intensity of the pixel P$_N$ (i, j) in the previous online-weighted-average frame OWAF (t$_0$-1).<br>I$_{Curr}$ (x, y) represents the intensity of the boundary pixel P$_B$ (x, y) in the current frame Frame (t$_0$).<br>The neighboring pixels P$_N$ surround the pixel P$_B$ (x, y) in the |

TABLE I-continued

A list of measurements calculated in the measuring window MW during a raster scan operation. A set of conditions for these measurements determines the update to the logo-boundary score of the logo mask LM generated by the logo filling unit 420.

| Measurement | Definition |
| --- | --- |
| | measuring window MW. |
| BrightMean | Average of $I_{prev}^{avg}(i, j)$ of the brighter pixels within the measuring window MW. |
| BrightDiffMean | Average of $|I_{Prev}^{avg}(i, j) - I_{Curr}(x, y)|$ for the brighter pixels within the measuring window MW. |
| DarkCount | Number of darker pixels. If $I_{prev}^{avg}(i, j)$ of a neighboring pixel $P_N(i, j)$ is less than $I_{Curr}(x, y)$ of the boundary pixel $P_B(x, y)$, the pixel $P_N(i, j)$ is a darker pixel. |
| DarkMean | Average of $I_{prev}^{avg}(i, j)$ of the darker pixels within the measuring window MW. |
| DarkDiffMean | Average of $|I_{Prev}^{avg}(i, j) - I_{Curr}(x, y)|$ for the darker pixels within the measuring window MW. |

In operation S760, the logo-boundary type of the boundary pixel $P_B(x, y)$ is determined using the measured parameters and the relationship shown in Table II below. A logo-boundary-type score LBT_SCORE is incremented or decremented according to the following relationship:

TABLE II

| LBT_SCORE += | |
| --- | --- |
| 1 | $\left(\dfrac{\text{BrightDiffMean}}{\text{BrightMean}} < \dfrac{\text{DarkDiffMean}}{\text{DarkMean}}\right)$ AND $\left(\dfrac{\text{DarkDiffMean}}{\text{DarkMean}} \geq \text{Thr1}\right)$ |
| -1 | $\left(\dfrac{\text{DarkDiffMean}}{\text{DarkMean}} < \dfrac{\text{BrightDiffMean}}{\text{BrightMean}}\right)$ AND $\left(\dfrac{\text{BrightDiffMean}}{\text{BrightMean}} \geq \text{Thr2}\right)$ |

Based on values of the neighboring pixels $P_N$ that are either brighter pixels or darker pixels, the logo filling unit 420 will increment the logo-boundary-type score LBT_SCORE when the brighter pixels have a lower variance with respect to the boundary pixel $P_B(x, y)$ as compared to the darker pixels. On the other hand, the logo filling unit 420 will decrement the logo-boundary-type score LBT_SCORE when the darker pixels have a lower variance with respect to the boundary pixel $P_B(x, y)$ as compared to the brighter pixels. Therefore, a negative logo-boundary-type score LBT_SCORE indicates a dark logo as the logo-boundary type, while a positive logo-boundary-type score LBT_SCORE indicates a bright logo as the logo-boundary type.

First and second threshold values Thr1 and Thr2 in Table II above may be the same or different. The first and second threshold values Thr1 and Thr2 are used to set a minimum variance for the neighboring pixels $P_N$ before modifying the logo-boundary-type score LBT_SCORE.

Additionally, before adjusting the logo-boundary-type score LBT_SCORE, the number of the darker pixels (e.g., DarkCount) or brighter pixels (e.g., BrightCount) should be large enough. For example, DarkCount and BrightCount may be compared against minimum threshold values.

After the determination of the logo-boundary type for the boundary pixel $P_B(x, y)$ corresponding to the entry LBV (x, y) of the logo-boundary mask LBM the logo filling unit 420 proceeds to operation S770.

In operation S770, the logo filling unit 420 attempts to moves to a next entry of the logo-boundary mask LBM by increasing a column coordinate y by 1. In operation S780, the logo filling unit 420 determines if the column coordinate y is less than or equal to y_MAX where y_MAX is a maximum column coordinate. Depending on the determination, the logo filling unit 420 proceeds back to operation S730 with respect to a next entry (e.g., LBV (x, y+1)) (operation S780:YES) or the logo filling unit 420 proceeds to operation S790 (operation S780: NO).

In operation S790, the logo filling unit 420 moves to the next row by increasing a row coordinate x in operation S790. In operation S800, the logo filling unit 420 determines if the row coordinate x is less than or equal to x_MAX where x_MAX is a maximum row coordinate. Depending on the determination, the logo filling unit 420 proceeds back to operation S730 with respect to a next entry (e.g., LBV (x+1, y)) (operation S780:YES) or the logo filling unit 420 completes the scanning operation on the logo-boundary mask LBM (operation S780: NO).

It is assumed here that the logo filling unit 420 performs operation S730 on a next entry LBV (x, y+1).

If an entry of the logo-boundary mask LBM (e.g., the next entry LBV (x, y+1)) is determined as a non-logo-boundary pixel (operation S730: NO), the logo filling unit 420 proceeds to operation S810. In operation S810, it is determined whether a boundary pixel was previously detected. Since the boundary pixel $P_B(x, y)$ was detected in a previous iteration, the logo filling unit 420 proceeds to operation S820. Otherwise, the logo filling unit 420 would proceed to operation S770 described above.

In operation S820, the pixel distance PD increases by a predetermined value, for example, 1, to measure the distance between the entry LBV (x, y), corresponding to the boundary pixel $P_B(x, y)$, and the next entry LBV (x, y+1). As described above, when the entry LBV (x, y) was determined to correspond to a boundary pixel, the pixel distance PD was initialized to zero in operation S740. Thus, as the logo filling unit 420 continues scanning the logo-boundary mask LBM, if more non-logo-boundary pixels are found, the pixel distance PD will continue to increase.

Figure 12:
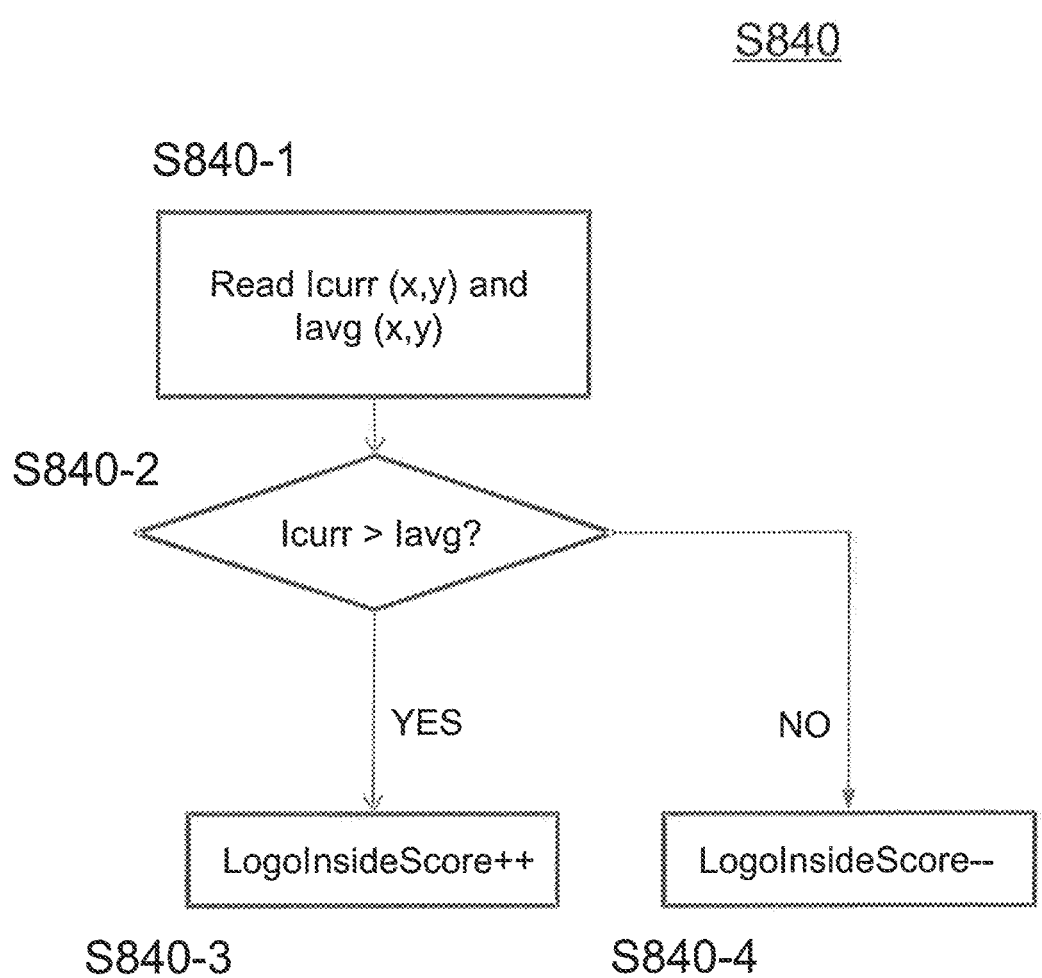
FIG. 12 is a flowchart showing a calculation of a logo-boundary score for a non-logo-boundary pixel according to an exemplary embodiment of the present inventive concept.

The logo filling unit 420 proceeds to operation S830 to check whether a next pixel P (x, y+1) of the video stream 350 corresponding to the next entry LBV (x, y+1) is within a pixel distance limit PDL, which may be a predetermined value. If the pixel distance PD is greater than or equal to the pixel distance limit PDL, the logo filling unit 420 categorizes the pixel P (x, y+1) as a non-logo pixel and proceeds to operation S770. If the pixel distance PD is less than the pixel distance limit PDL, the logo filling unit 420 proceeds to operation S840 to calculate a logo-boundary score LogoInsideScore of the next pixel P (x, y+1), as shown in FIG. 12. The logo-boundary score LogoInsideScore represents whether a non-logo-boundary pixel within the logo 220 should be brightened or darkened. After calculating the logo-boundary score LogoInsideScore, the logo filling unit proceeds to operation S770.

FIG. 12 is a flowchart showing a calculation of a logo-boundary score for a non-logo-boundary pixel according to an exemplary embodiment of the present inventive concept.

Operation S840 of FIG. 10 may include operations S840-1 to S840-4 described below. In operation S840-1, the logo filling unit 420 determines $I_{curr}$ (x, y) and $I_{avg}$ (x, y) from the current frame Frame ($t_0$) and the current online-weighted-average frame OWAF ($t_0$), respectively. $I_{Curr}$ (x, y) represents an intensity of the pixel P (x, y) at the coordinate (x, y) in the current frame Frame ($t_0$). $I_{avg}$ (x, y) represents an average intensity of the pixel P (x, y) at the coordinate (x, y) in the current online-weighted-average frame OWAF ($t_0$). In this case, the pixel P (x, y) is the non-logo-boundary pixel being scanned in operation S840.

In operation S840-2, the logo filling unit 420 determines whether $I_{curr}$ (x, y) is greater than $I_{avg}$ (x, y).

If $I_{curr}$ (x, y) is greater than $I_{avg}$ (x, y) and if the logo-boundary type is a bright logo, the logo filling unit 420 proceeds to operation 840-3 to increase a logo-boundary score LogoInsideScore by a first predetermined amount. For example, the first predetermined amount is equal to '1'.

If $I_{curr}$ (x, y) is less than or equal to $I_{avg}$ (x, y) and if the logo-boundary type is a dark logo, the logo filling unit 420 proceeds to operation 840-4 to decrease the logo-boundary score LogoInsideScore by a second predetermined amount. For example, the second predetermined amount is equal to '1'. In an exemplary embodiment of the present inventive concept, the first predetermined amount and the second predetermined amount are the same.

As such, the logo-boundary score LogoInsideScore may indicate whether to brighten or darken the non-logo-boundary pixel in the logo filling operation according to the logo-boundary type of the logo-boundary pixel. For example, a positive logo-boundary score LogoInsideScore may indicate that the non-logo-boundary pixel should be brightened to match a bright logo. A negative logo-boundary score LogoInsideScore may indicate that the non-logo-boundary pixel should be darkened to match a dark logo.

As described above, according to an exemplary embodiment of the present inventive concept, to generate the logo mask LM, a scanning operation is performed on the logo-boundary mask LBM to search for a logo-boundary entry (e.g., LBV (x, y)) of the logo-boundary mask LBM representing a logo-boundary pixel of the video stream 350. If the logo-boundary entry indicates that a pixel of the video stream 350 associated with the logo-boundary entry is a logo-boundary pixel (e.g., $P_B$ (x, y)), a logo-boundary type of the logo-boundary entry is determined using an intensity of the logo-boundary pixel in a current frame of the video stream 350 and intensities of non-logo-boundary pixels of a previous online-weighted-average frame selected by a measuring window MW. The logo-boundary pixel of the current frame corresponds to the logo-boundary entry of the logo-boundary mask. The non-logo-boundary pixels of the previous online-weighted-average frame correspond to logo-boundary entries surrounding the logo-boundary entry of the logo-boundary mask LBM. Additionally, in the logo filling operation, the non-logo-boundary pixels within the logo are filled (either brightened or darkened) according to the determined logo-boundary type. Thus, over time, the logo mask LM with a clearly defined logo may be generated.

Figure 13:
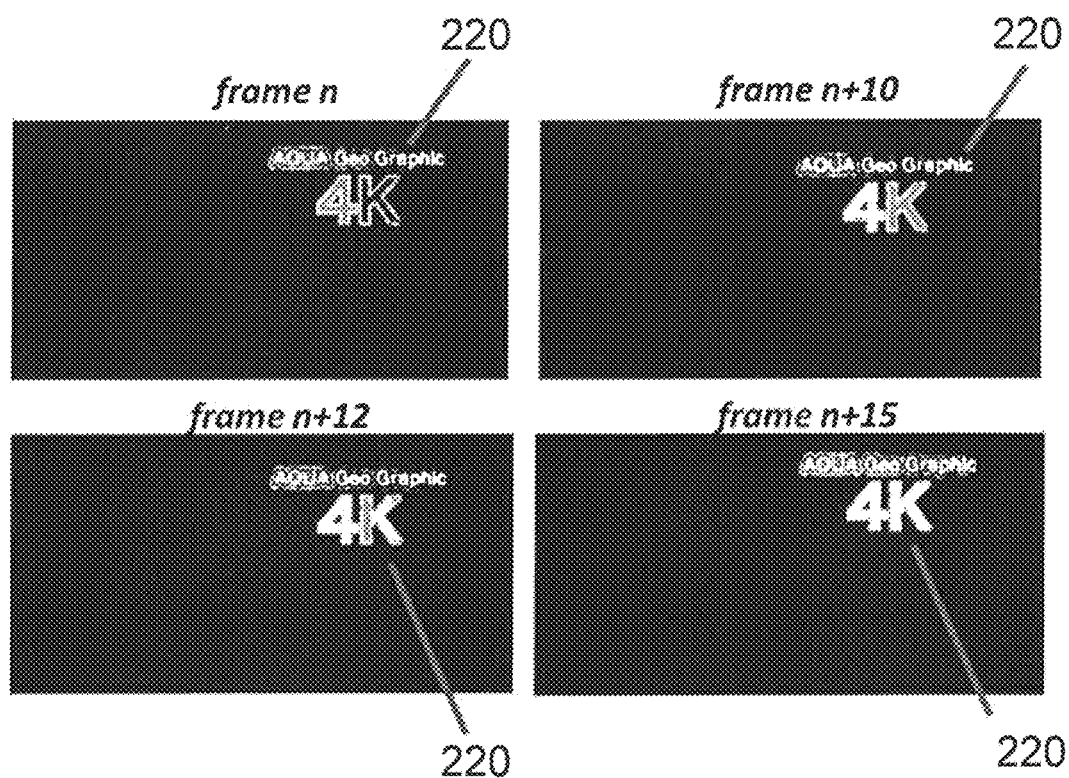
FIG. 13 shows a gradual filling of a logo-boundary mask according to an exemplary embodiment of the present inventive concept.

FIG. 13 shows a gradual filling of a logo-boundary mask according to an exemplary embodiment of the present inventive concept.

Referring to FIG. 13, over a number of frames in the video stream 350 (e.g., from frame n to frame n+15), the inside of a logo (e.g., the logo 220) is gradually filled according to the logo-boundary type thereof. In this case, the logo-boundary type is a bright logo, and thus, the inside of the logo becomes brighter against its background. If the logo-boundary type is a dark logo, the inside of the logo becomes darker against its background.

While the present inventive concept has been shown and described with reference to exemplary embodiments thereof, it will be apparent to those of ordinary skill in the art that various changes in form and details may be made thereto without departing from the spirit and scope of the inventive concept as set forth by the following claims.

What is claimed is:

1. A method of extracting a logo mask from a video stream having a logo, the method comprising:
   receiving the video stream including a plurality of frames,
   generating sequentially a plurality of online-weighted-average frames using the video stream; and
   generating a logo-boundary-score map using a current frame among the plurality of frames and a current online-weighted-average frame among the plurality of online-weighted-average frames,
   wherein the logo-boundary-score map includes a plurality of logo-boundary-score entries, each of which corresponds to one of a plurality of pixels of the video stream and includes a probability that a corresponding one of the plurality of pixels is a logo-boundary pixel, and
   wherein the logo mask includes a plurality of entries, each of which corresponds to one of the plurality of pixels and represents whether a corresponding one of the plurality of pixels is a logo pixel or a non-logo pixel.

2. The method of claim 1,
   wherein the logo is overlaid on at least one of the plurality of frames.

3. The method of claim 1, wherein generating sequentially the plurality of online-weighted-average frames includes:
   generating a previous online-weighted-average frame; and
   generating the current online-weighted-average frame using the previous online-weighted-average frame and the current frame.

4. The method of claim 1, wherein generating sequentially the plurality of online-weighted-average frames includes:
   calculating a current online-weighted-average intensity $I(x, y)_{t_0}^{avg}$ of a pixel located at a coordinate (x, y) of the video stream, wherein the current online-weighted-average intensity $I(x, y)_{t0}^{avg}$ is calculated using the following equation:

$$I(x,y)_{t0}^{avg}=(1-w_{t0}) \cdot I(x,y)_{t0-1}^{avg}+w_{t0} \cdot I(x,y)_{t0}$$

wherein $I(x, y)_{t0-1}^{avg}$ represents an intensity of a pixel located at the coordinate (x, y) of the current frame,
wherein $I(x, y)_{t0-1}^{avg}$ represents a previous online-weighted-average intensity of a pixel located at the coordinate (x, y) in a previous online-weighted-average frame,
wherein t0 is a first timing and t0-1 is a second timing that precedes the first timing, and
wherein $w_{t0}$ is a weight value of the current frame and $w_{t0}$ is a rational number.

5. The method of claim 4, wherein generating the logo-boundary-score map includes:
generating a current edge map using the current frame;
generating an average edge map using the current online-weighted-average frame; and
calculating a logo-boundary score using the current edge map and the average edge map.

6. The method of claim 5, wherein generating the current edge map and generating the average edge map are performed using an edge detection algorithm.

7. The method of claim 5, wherein calculating the logo-boundary score is performed using the following equation:

$$LBS(x, y) = \begin{cases} PositiveVal & \text{if } (grad^{avg}(x, y) > TH1) \text{ AND } (grad^{curr}(x, y) > TH2) \\ NegativeVal & \text{if } (grad^{avg}(x, y) \leq TH1) \text{ OR } (grad^{curr}(x, y) \leq TH2) \end{cases},$$

wherein LBS (x, y) represents the logo-boundary score of a pixel located at the coordinate (x, y) of the video stream,
wherein $grad^{avg}$ (x, y) represents an intensity gradient of a pixel located at the coordinate (x, y) of the current online-weighted-average frame,
wherein $grad^{curr}$ (x, y) represents an intensity gradient of a pixel located at the coordinate (x, y) of the current frame,
wherein TH1 and TH2 represent predetermined threshold values, and
wherein PositiveVal represents a predetermined positive value for the logo-boundary score and NegativeVal represents a predetermined negative value for the logo-boundary score.

8. The method of claim 1, further comprising:
calculating an aggregated-logo-boundary-score map using the logo-boundary-score map; and
generating a logo-boundary mask by determining whether each pixel of the video stream is the logo-boundary pixel or a non-logo-boundary pixel using the aggregated-logo-boundary-score map.

9. The method of claim 8, wherein calculating the aggregated-logo-boundary-score map is performed over an aggregating window, and
an entry of the aggregated-logo-boundary-score map is an average of a plurality of logo-boundary-score entries, from the logo-boundary-score map, within the aggregating window.

10. The method of claim 8,
wherein calculating the aggregated-logo-boundary-score map is recursively performed on the plurality of frames in the video stream using the following equation:

$$AggScore_{Curr}(x,y)=AggScore_{Prev}(x,y)+Score_{Curr}(x,y),$$

wherein $AggScore_{Curr}$ (x, y) is a current aggregated-logo-boundary score associated with a pixel located at the coordinate (x, y) of the video stream,
wherein $AggScore_{Prev}$ (x, y) is a previous aggregated-logo-boundary score associated with the pixel located at the coordinate (x, y) of the video stream, and
wherein $Score_{Curr}$ (x, y) is a logo-boundary score of a pixel located at the coordinate (x, y) of the current frame.

11. The method of claim 10, wherein determining whether each pixel of the video stream is the logo-boundary pixel or the non-logo-boundary pixel using the aggregated-logo-boundary-score map includes:
comparing the current aggregated-logo-boundary score of a selected pixel of the video stream with a predetermined value;
determining the selected pixel is the logo-boundary pixel if the current aggregated-logo-boundary score of the selected pixel is greater than the predetermined value; and
determining the selected pixel is the non-logo-boundary pixel if the current aggregated-logo-boundary score of the pixel is less than or equal to the predetermined value.

12. The method of claim 8,
wherein if an aggregated-logo-boundary score for a first pixel of the video stream is greater than a predetermined value, the first pixel is classified as the logo-boundary pixel,
wherein if the aggregated-logo-boundary score is less than or equal to the predetermined value, the first pixel is classified as the non-logo-boundary pixel, and
wherein the logo-boundary mask includes a plurality of logo-boundary entries, each of which represents whether a corresponding pixel of the video stream is the logo-boundary pixel or the non-logo-boundary pixel.

13. The method of claim 12, further comprising:
generating the logo mask using the logo-boundary mask, the current frame, and the current online-weighted-average frame.

14. The method of claim 13, wherein generating the logo mask includes:
performing a scanning operation on the logo-boundary mask to search for a first logo-boundary entry of the logo-boundary mask representing a first logo-boundary pixel of the video stream; and
determining a logo-boundary type of the first logo-boundary entry using an intensity of the first logo-boundary pixel in the current frame of the video stream and intensities of non-logo-boundary pixels in a previous online-weighted-average frame selected by a measuring window,
wherein the non-logo-boundary pixels surround the first logo-boundary pixel within the measuring window.

15. The method of claim 14, wherein generating the logo mask further includes:
calculating, according to the logo-boundary type of the first logo-boundary pixel of the video stream, a logo-boundary score of a first non-logo-boundary pixel of the video stream located within a pixel distance limit from the first logo-boundary pixel.

16. The method of claim 15, wherein calculating the logo-boundary score includes:

increasing the logo-boundary score by a first predetermined amount if the logo-boundary type of the first logo-boundary pixel is the bright logo and if an intensity of the first non-logo-boundary pixel in the current frame is greater than an average intensity of the first non-logo-boundary pixel in the current online-weighted-average frame; and decreasing the logo-boundary score by a second predetermined amount if the logo-boundary type of the first logo-boundary pixel is the dark logo and if the intensity of the first non-logo-boundary pixel in the current frame is less than or equal to the average intensity of the first non-logo-boundary pixel in the current online-weighted-average frame.

17. The method of claim 16, wherein if the logo-boundary score of the first non-logo-boundary pixel is positive, the first non-logo-boundary pixel is brightened, and wherein if the logo-boundary score of the first non-logo-boundary pixel is negative, the first non-logo-boundary pixel is darkened.

18. A method of extracting a logo mask from a video stream having a logo, the method comprising:

receiving the video stream including a plurality of frames;

generating sequentially a plurality of online-weighted-average frames using the video stream; and generating a logo-boundary mask using a current frame among the plurality of frames and a previous online-weighted-average frame among the plurality of online-weighted-average frames, wherein the logo-boundary mask includes a logo-boundary pixel and a non-logo-boundary pixel; and filling the logo-boundary mask to generate the logo mask according to a plurality of logo-boundary scores, wherein a first logo-boundary score of the non-logo-boundary pixel is determined by comparing an intensity of the non-logo-boundary pixel in the current frame and an average intensity of the non-logo-boundary pixel in a current online-weighted-average frame among the plurality of online-weighted-average frames, wherein the logo mask includes a plurality of entries, each of which represents whether a pixel of the video stream is a logo pixel or a non-logo pixel.

19. A method of detecting a logo from a video stream, the method comprising:

receiving the video stream including a plurality of frames;

generating a current edge map using a current frame among the plurality of frames;

generating a current online-weighted-average frames by recursively adding an intensity of the current frame of the video stream to an intensity of a previous online-weighted-average frame;

generating an average edge map using the current online-weighted-average frame; and generating a logo-boundary-score map using the current edge map and the average edge map.

* * * * *